US009829096B2

(12) United States Patent
Philippart et al.

(10) Patent No.: US 9,829,096 B2
(45) Date of Patent: Nov. 28, 2017

(54) SYSTEM AND METHOD FOR CONTROLLING A TRANSMISSION WHEN A FAULT IS DIAGNOSED IN A TRANSMISSION CONTROL SYSTEM

(71) Applicant: GM Global Technology Operations LLC, Detroit, MI (US)

(72) Inventors: Timothy P. Philippart, Orion, MI (US); Michael R. Grimes, Saline, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 73 days.

(21) Appl. No.: 14/950,505

(22) Filed: Nov. 24, 2015

(65) Prior Publication Data

US 2017/0146117 A1    May 25, 2017

(51) Int. Cl.
*F16H 61/00* (2006.01)
*F16H 61/12* (2010.01)
*F16H 61/02* (2006.01)

(52) U.S. Cl.
CPC ......... *F16H 61/12* (2013.01); *F16H 61/0204* (2013.01); *F16H 2061/1208* (2013.01); *F16H 2061/1224* (2013.01)

(58) Field of Classification Search
CPC ................. F16H 61/12; F16H 61/0204; F16H 2061/1224; F16H 2061/1208
See application file for complete search history.

(56) References Cited

U.S. PATENT DOCUMENTS

| | | | | |
|---|---|---|---|---|
| 5,315,972 A | * | 5/1994 | Judy | B60K 31/00 123/198 D |
| 6,223,113 B1 | * | 4/2001 | McCunn | F16H 61/12 192/3.57 |
| 6,307,376 B1 | * | 10/2001 | Alexander | F16H 61/12 324/388 |
| 2005/0080527 A1 | * | 4/2005 | Tao | F16H 59/38 701/31.1 |
| 2008/0176706 A1 | * | 7/2008 | Wu | B60K 6/365 477/5 |
| 2008/0176709 A1 | * | 7/2008 | Wu | B60K 6/445 477/143 |
| 2009/0088279 A1 | * | 4/2009 | Martini | B60K 6/445 475/5 |
| 2011/0144925 A1 | * | 6/2011 | Long | F16H 61/12 702/35 |

* cited by examiner

*Primary Examiner* — David J Hlavka

(57) ABSTRACT

A system according to the principles of the present disclosure includes a first solenoid control module, a fault diagnostic module, and a second solenoid control module. The first solenoid control module controls a plurality of solenoids to shift gears in a transmission. The fault diagnostic module diagnosis a fault in a transmission control system based on an operating parameter of the transmission control system. The second solenoid control module selectively controls the plurality of solenoids to shift gears in the transmission when a fault in the transmission control system is diagnosed.

20 Claims, 3 Drawing Sheets

SYSTEM AND METHOD FOR CONTROLLING A TRANSMISSION WHEN A FAULT IS DIAGNOSED IN A TRANSMISSION CONTROL SYSTEM

FIELD

The present disclosure relates to internal combustion engines, and more specifically, to systems and methods for controlling a transmission when a fault is diagnosed in a transmission control system.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A transmission control system typically controls a plurality of solenoids to shift gears in a transmission. In one example, the transmission control system energizes (e.g., opens) one or more solenoids to shift the transmission to a particular gear. The transmission control system energizes a solenoid by adjusting the amount of current supplied to the solenoid. Energizing the solenoid changes the level of hydraulic pressure that is used to actuate a plurality of clutches in the transmission. In one example, the transmission control system increases the amount of current supplied to a solenoid to energize the solenoid, which increases the hydraulic pressure and thereby actuates a transmission clutch.

Transmission systems typically rely on a hydraulic default gear in the event that the transmission control system experiences a fault such as a loss of power fault or a processor integrity fault (e.g., a memory fault, a watchdog timeout). In one example, a solenoid may inhibit a default gear such as park when the solenoid is energized. Thus, when a power supply to the transmission control system is interrupted and, as a result, the ability of the transmission control system to energize the solenoid is interrupted, the solenoid no longer inhibits the default gear. Therefore, the transmission shifts to the default gear.

Some transmission systems rely on an electronic default gear in the event that the transmission control system experiences a fault. In one example, the transmission control system attempts to shift the transmission to a default gear such as park or neutral when the transmission control system experiences a fault. In certain conditions, such as when a vehicle is moving, it may not be desirable to shift the transmission to a default gear such as park or neutral.

SUMMARY

A system according to the principles of the present disclosure includes a first solenoid control module, a fault diagnostic module, and a second solenoid control module. The first solenoid control module controls a plurality of solenoids to shift gears in a transmission. The fault diagnostic module diagnosis a fault in a transmission control system based on an operating parameter of the transmission control system. The second solenoid control module selectively controls the plurality of solenoids to shift gears in the transmission when a fault in the transmission control system is diagnosed.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A transmission control system according to the present disclosure includes various components that provide backup operation when the transmission control system experiences a fault such as a loss of power fault or a processor integrity fault. In one example, the transmission control system includes a first solenoid control module and a second solenoid control module. The first solenoid control module controls a plurality of solenoids to shift gears in a transmission during normal operation. The second solenoid control module controls the solenoids to shift gears in the transmission when a fault in the transmission control system is diagnosed.

In various implementations, the second solenoid control module shifts the transmission to a gear other than a default gear (e.g., a gear other than park or neutral) when vehicle operating conditions satisfy certain criteria. In one example, the second solenoid control module shifts the transmission to a forward gear (e.g., first gear) when the speed of a vehicle is greater than a threshold, indicating that the vehicle is moving. In this way, a transmission control system according to the present disclosure is not limited to shifting the transmission to a default gear such as park or neutral in the event that the transmission control system experiences a fault.

In various implementations, the first and second solenoid control modules receive power independently from different power supplies. In addition, the second solenoid control module may shift the solenoids based on inputs from sensors that are powered independent of the power supplied to the first solenoid control module. Thus, the second solenoid control module may continue to function properly when the power supplied to the first solenoid control module is interrupted.

Figure 1:
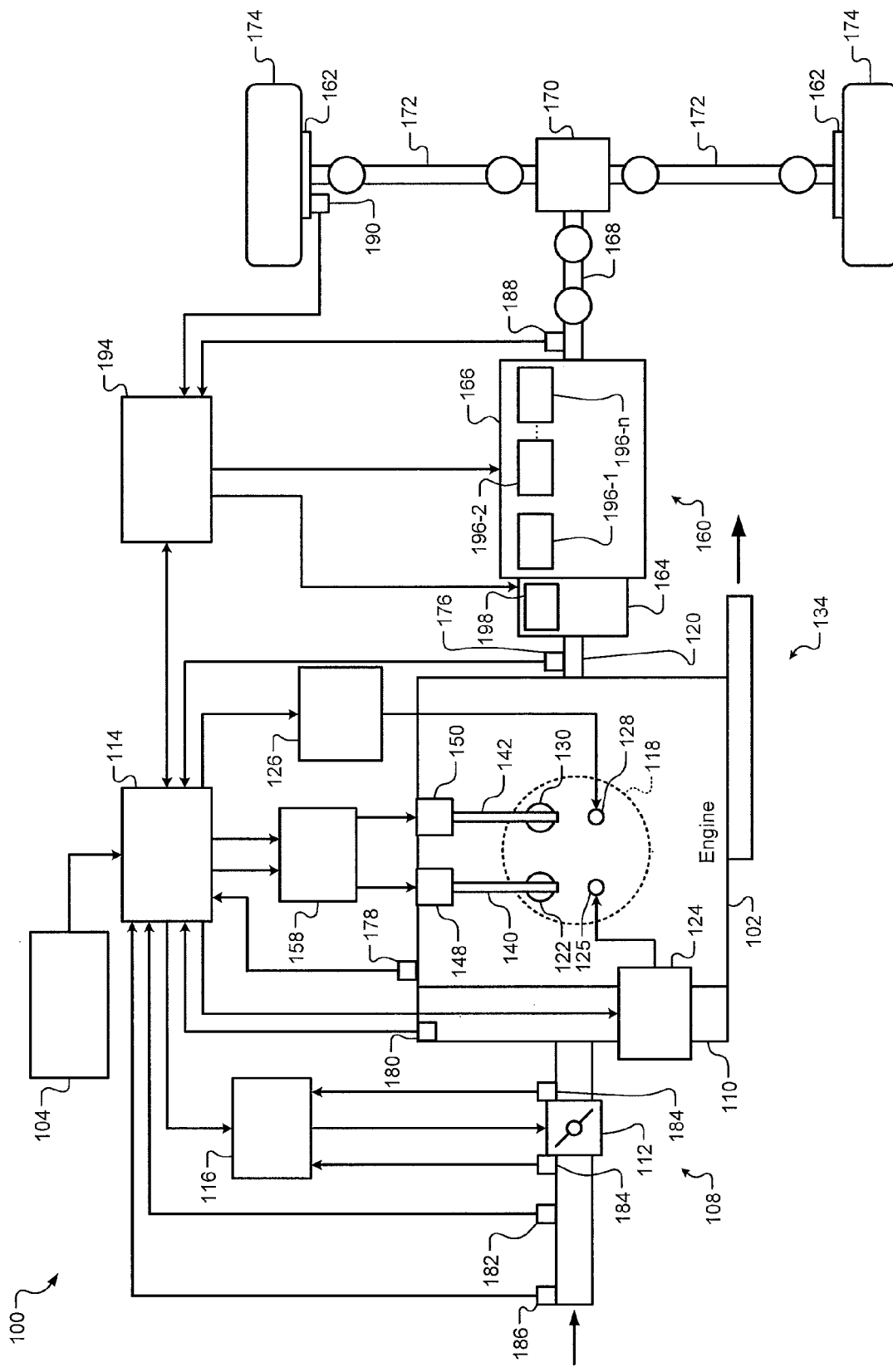
FIG. 1 is a functional block diagram of an example engine system according to the principles of the present disclosure.

Referring now to FIG. 1, an example implementation of a vehicle system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft 120, two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injections performed by a fuel injector 125 to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft 120. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148, 150 based on signals from the ECM 114. When implemented, variable valve lift may also be controlled by the valve actuator module 158.

The valve actuator module 158 may deactivate the cylinder 118 by disabling opening of the intake valve 122 and/or the exhaust valve 130. The valve actuator module 158 may disable opening of the intake valve 122 by decoupling the intake valve 122 from the intake cam phaser 148. Similarly, the valve actuator module 158 may disable opening of the exhaust valve 130 by decoupling the exhaust valve 130 from the exhaust cam phaser 150. In various implementations, the valve actuator module 158 may control the intake valve 122 and/or the exhaust valve 130 using devices other than camshafts, such as electromagnetic or electrohydraulic actuators.

Torque output at the crankshaft 120 is transferred through a drivetrain system 160 to wheels 162. The drivetrain system 160 includes a torque converter 164, a transmission 166, a drive shaft 168, a differential 170, and axle shafts 172. The torque converter 164, the transmission 166, and the differential 170 amplify engine torque by several gear ratios to provide axle torque at the axle shafts 172. The axle torque rotates the wheels 162 and tires 174 mounted on the wheels 162, which causes the vehicle to accelerate in a forward or rearward direction.

The vehicle system 100 may measure the position of the crankshaft 120 using a crankshaft position (CKP) sensor 176. The temperature of the engine coolant may be measured using an engine coolant temperature (ECT) sensor 178. The ECT sensor 178 may be located within the engine 102 or at other locations where the coolant is circulated, such as a radiator (not shown).

The pressure within the intake manifold 110 may be measured using a manifold absolute pressure (MAP) sensor 180. In various implementations, engine vacuum, which is the difference between ambient air pressure and the pressure within the intake manifold 110, may be measured. The mass flow rate of air flowing into the intake manifold 110 may be measured using a mass air flow (MAF) sensor 182. In various implementations, the MAF sensor 182 may be located in a housing that also includes the throttle valve 112.

The throttle actuator module 116 may monitor the position of the throttle valve 112 using one or more throttle position sensors (TPS) 184. The ambient temperature of air being drawn into the engine 102 may be measured using an intake air temperature (IAT) sensor 186. The speed of the transmission 166 may be measured using a transmission speed (TS) sensor 188. The TS sensor 188 may include a transmission input speed (TIS) sensor, a transmission output speed (TOS) sensor, and/or one or more transmission intermediate speed sensors. The speed of the wheels 162 may be measured using a wheel speed (WS) sensor 190. The ECM 114 may use signals from the sensors to make control decisions for the vehicle system 100.

The ECM 114 may communicate with a transmission control module (TCM) 194 to coordinate shifting gears in the transmission 166. For example, the ECM 114 may reduce engine torque during a gear shift. Although some of the sensor signals are shown provided to the ECM 114, the ECM 114 may relay these sensor signals to the TCM 194. For example, the ECM 114 may relay the signal from the CKP sensor 176 to the TCM 194, and the relayed signal may be referred to as a replicated CKP signal. Alternatively, these sensor signals may be provided to the TCM 194 directly.

The TCM 194 may control a plurality of solenoid valves in the transmission 166 to engage various clutches in the transmission 166 and thereby shift gears in the transmission 166. For example, the TCM 194 may control a first solenoid valve 196-1, a second solenoid valve 196-2, and an Nth solenoid valve 196-N. The TCM 194 may energize (e.g., open) one or more of the solenoid valves 196-1 through 196-N to shift the transmission 166 to a particular gear.

The TCM 194 may also control a solenoid valve 198 in the torque converter 164 to couple the engine 102 to the transmission 166 or decouple the engine 102 from the transmission 166. For example, the TCM 194 may energize the solenoid valve 198 to engage a clutch (not shown) in the torque converter 164 and thereby couple the engine 102 to the transmission 166. Conversely, the TCM 194 may de-energize (e.g., close) the solenoid valve 198 to disengage the torque converter clutch and thereby decouple the engine 102 from the transmission 166.

Figure 2:
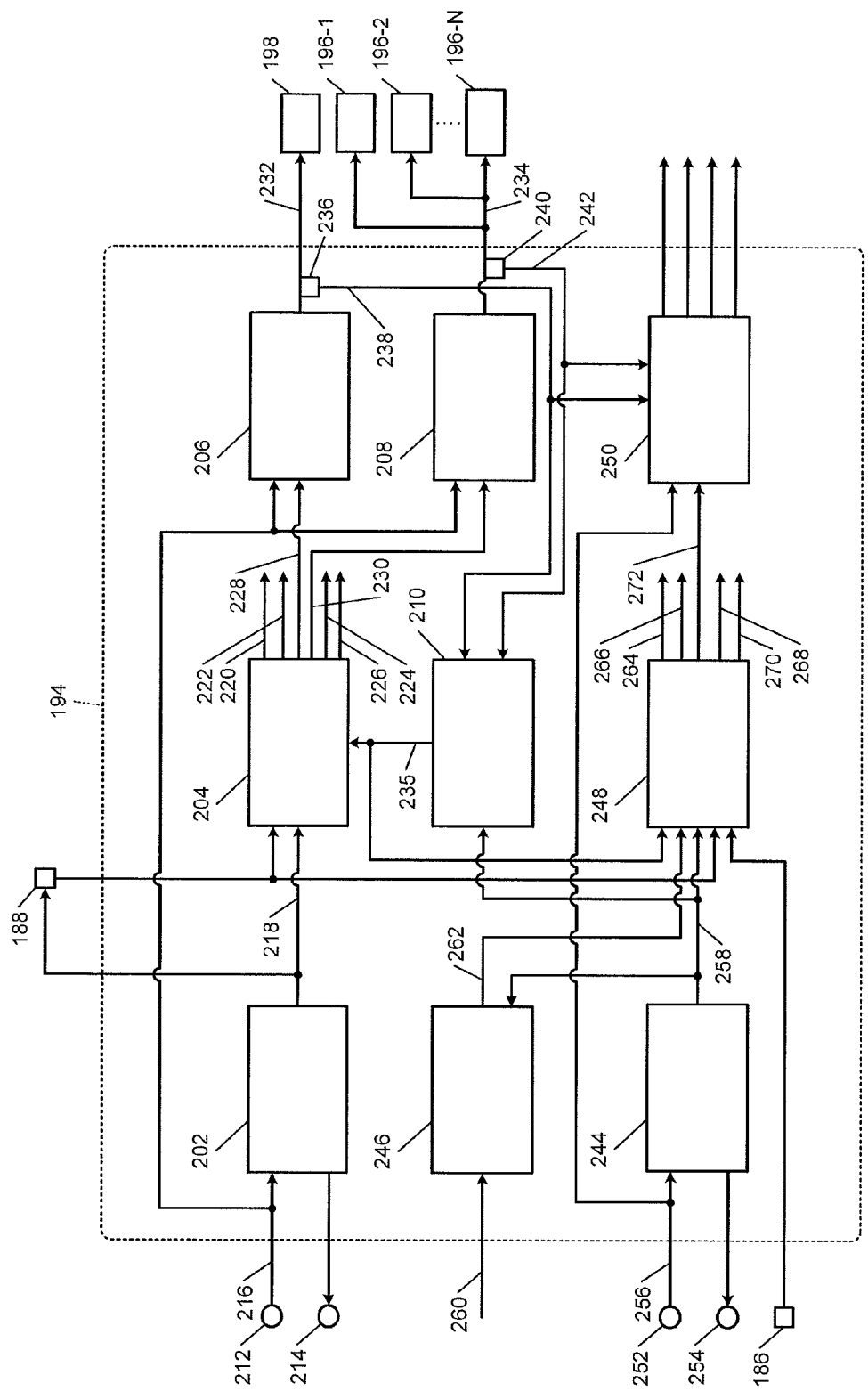
FIG. 2 is a functional block diagram of an example control system according to the principles of the present disclosure.

Referring now to FIG. 2, an example implementation of the TCM 194 includes a first power supply module 202, a first solenoid control module 204, a first driver module 206, a second driver module 208, and a fault diagnostic module 210. The first power supply module 202 is connected to a first power pin 212 and a first ground pin 214. The first power pin 212 may receive power from a battery (not shown), and the first ground pin 214 may be connected to a ground (not shown). The first power supply module 202 may convert power 216 received from the first power pin 212 into power 218 that is compatible with the modules 204-208 and/or the TS sensor 188.

The first solenoid control module 204 outputs control signals 220, 222, 224, and 226 to control the solenoid valves 196-1, 196-2, 196-N, and 198, respectively. The first solenoid control module 204 may output the control signal 220 to the first driver module 206 and output the control signals 222, 224, and 226 to the second driver module 208. The first and second driver modules 206 and 208 may each include current controlled output (CCO) drivers and/or low-side output (LSO) drivers. The first driver module 206 may control the amount of current supplied to the solenoid valve 198 based on the control signal 220. For example, the control signal 220 may indicate a target amount of current, and the first driver module 206 may adjust the amount of current supplied to the solenoid valve 198 to the target current amount. The second driver module 208 may control the amount of current supplied to the solenoid valves 196-1, 196-2, and 196-N based on the control signals 222, 224, and 226, respectively. For example, the control signals 222, 224, and 226 may each indicate a target amount of current, and the first driver module 206 may adjust the amount of current supplied to the solenoid valves 196-1, 196-2, and 196-N to their respective target current amounts.

In various implementations, each of the control signals 220, 222, 224, and 226 may indicate a target amplitude, a target duty cycle, and/or a target frequency for an average current and/or a dither current (or ripple current). In these implementations, the first driver module 206 may adjust the amplitude, duty cycle, and/or frequency of the current supplied to the solenoid valve 198 based on the target values indicated by the control signal 220. Similarly, the second driver module 208 may adjust the amplitude, duty cycle, and/or frequency of the current supplied to the solenoid valves 196-1, 196-2, and 196-N based on the target values indicated by the control signals 222, 224, and 226, respectively. In one example, the first and second driver modules 206 and 208 supply current having a fixed amplitude to the solenoid valves 196-1, 196-2, 196-N, 198, and achieve the target amplitude for the average current by adjusting the duty cycle of the current. The first and second driver modules 206 and 208 may only control the amount of current supplied to the solenoid valves 196-1, 196-2, and 196-N when the first and second driver modules 206 and 208 are enabled.

When enabled, the first and second driver modules 206 and 208 may control the amount of current supplied to the solenoid valves 196-1, 196-2, 196-N, and 198 in a closed-loop manner. For example, the first and second driver modules 206 and 208 may adjust the amount of voltage delivered to the solenoid valves 196-1, 196-2, 196-N, and 198 to minimize a difference between a measured amount of current supplied to the solenoid valves 196-1, 196-2, 196-N, and 198 and a target amount of current. The measured current amounts may be different than target current amounts due to variations and changes in system voltage and path resistance. The first and second driver modules 206 and 208 may include current sensors that measure the current supplied to the solenoid valves 196-1, 196-2, 196-N, and 198. These current measurements may include average current, peak current, and trough current values.

The first and second driver modules 206 and 208 may include internal fault protection and diagnostic capabilities. These fault protection capabilities may impact the control of one or more solenoids. For example, if a short-to-ground fault is experienced in on a high-side driver output of the first driver modules 206, the first driver module 206 may shutdown the output to protect from excessive current and thermal energy. Shutting down the output may impact one solenoid or all solenoids depending on how the wiring of the solenoids is architected.

The first solenoid control module 204 outputs the control signals 220, 222, and 224 to control the solenoid valves 196-1, 196-2, and 196-N, respectively, and thereby shift gears in the transmission 166. The first solenoid control module 204 may shift gears in the transmission 166 based on the transmission speed measured by the TS sensor 188. The modules 204-208 and/or the TS sensor 188 may be powered by the converted power 218 from the first power supply module 202.

In addition, the first solenoid control module 204 may output control signals 228 and 230 to control the first and second driver modules 206 and 208, respectively. For example, the first solenoid control module 204 may output the control signal 228 to enable or disable the first driver module 206, and the first solenoid control module 204 may output the control signal 230 to enable or disable the second driver module 208.

The first driver module 206 receives the unconverted power 216 from the first power pin 212 and regulates the amount of current 232 that flows from the first power pin 212 to the solenoid valve 198. The first driver module 206 may regulate the amount of current 232 that flows from the first power pin 212 to the solenoid valve 198 based on a target amount of current indicated by the control signal 220. The first driver module 206 may prevent current flow to the solenoid valve 198 when the first driver module 206 is disabled. The first driver module 206 may allow current to flow to the solenoid valve 198 when the first driver module 206 is enabled. The first driver module 206 may include one or more high-side drivers and/or one or more low-side drivers. A high-side driver provides voltage to the potential side of a solenoid, allowing for double-sided control. A high-side driver may be shared across one or more solenoid valves.

In various implementations, the first driver module 206 may control current flow to a plurality of solenoids such as a line pressure solenoid, a torque converter clutch solenoid, one or more transmission clutch solenoids, and a park inhibit solenoid. Many of these solenoids may be used for electronic range selection and to satisfy a plurality of transmission oil flows. The park inhibiting solenoid may prevent the transmission 166 from shifting to park when the park inhibiting solenoid is energized. Thus, when the park inhibiting solenoid is not energized, the transmission 166 may shift to park. In this regard, the TCM 194 may shift the transmission to a default gear of park by disabling the first driver module 206 and thereby forcing the transmission 166 to shift to park.

The second driver module 208 receives the unconverted power 216 from the first power pin 212 and regulates the amount of current 234 that flows from the first power pin 212 to the solenoid valves 196-1 through 196-N. The first driver module 206 may regulate the amount of current 234 that flows from the first power pin 212 to the solenoid valves 196-1, 196-2, and 196-N based on a target amount of current indicated by the control signals 222, 224, and 226, respectively. The second driver module 208 may prevent current flow to the solenoid valves 196-1 through 196-N when the second driver module 208 is disabled. The second driver module 208 may allow current to flow to the solenoid valves 196-1 through 196-N when the second driver module 208 is enabled. The second driver module 208 may include one or more high-side drivers and/or one or more low-side drivers.

The fault diagnostic module 210 diagnoses faults in the TCM 194, the first power pin 212, and the first ground pin 214, which may collectively be referred to as a transmission control system, based on various operating parameters of the transmission control system. The fault diagnostic module 210 may diagnose faults such as a loss of power fault or a processor integrity fault. The fault diagnostic module 210 may diagnose a processor integrity fault when the first solenoid control module 204 experiences a random access memory fault, a read-only memory or flash fault, a memory checksum error, an arithmetic logic unit fault, a watchdog timeout fault, or other errors that influence the actions of the first solenoid control module 204. The fault diagnostic module 210 outputs a signal 235 indicating whether a fault in the transmission system is diagnosed. The first solenoid control module 204 may adjust the control signals 228 and 230 to disable the first and second driver modules 206 and 208, respectively, when the signal 235 indicates that a fault in the transmission system is diagnosed. In various implementations, the fault diagnostic module 210 may disable the first and second driver modules 206 and 208 directly when a fault in the transmission system is diagnosed. In these implementations, the fault diagnostic module 210 may output the control signals 228 and 230.

The fault diagnostic module 210 may diagnose a loss of power fault when the voltage output of the first driver module 206 is less than a predetermined value. A voltage sensor 236 may measure the voltage output of the first driver module 206 and output a signal 238 indicating the same. The fault diagnostic module 210 may also diagnose a loss of power fault when the voltage output of the second driver module 208 is less than a predetermined value. A voltage sensor 240 may measure the voltage output of the second driver module 208 and output a signal 242 indicating the same. The voltage sensors 236 and 240 may be powered independent of the first power pin 212 and the first power supply module 202.

The fault diagnostic module 210 may also diagnose a loss of power fault when the unconverted power 216 from the first power pin 212 is less than a predetermined value. Similarly, the fault diagnostic module 210 may diagnose a loss of power fault when the converted power 218 from the first power supply module 202 is less than a predetermined value. The fault diagnostic module 210 may determine the magnitude of the unconverted power 216 and the converted power 218 using voltage and/or current sensors (not shown), which may be powered independent of the first power pin 212 and the first power supply module 202.

The first solenoid control module 204 may disable the first driver module 206 and/or the second driver module 208 when the fault diagnostic module 210 diagnoses a fault in the transmission control system. If the first driver module 206 is disabled, the park inhibit solenoid may be de-energized, and the transmission 166 may be shifted to park. In this way, the first solenoid control module 204 may shift the transmission to a default gear such as park or neutral when a fault in the transmission control system is diagnosed.

The example implementation of the TCM 194 shown in FIG. 2 further includes a second power supply module 244, an engine speed module 246, a second solenoid module 248, and a third driver module 250. The second power supply module 244 is connected to a second power pin 252 and a first ground pin 254. The second power pin 252 may receive power from a battery (not shown), and the second ground pin 254 may be connected to a ground (not shown). The second power supply module 244 may convert power 256 received from the second power pin 252 into power 258 that is compatible with the modules 210 and 246-250 and/or the voltage sensors 236 and 240. The modules 210 and 246-250 and/or voltage sensors 236 and 240 may be powered by the converted power 258 from the second power supply module 244.

The engine speed module 246 determines the speed of the engine 102 based on a replicated CKP signal 260 from the ECM 114. For example, the engine speed module 246 may calculate the engine speed based on a period that elapses as the crankshaft completes one or more revolutions. The ECM 114 may be powered by an external power source (e.g., a power source other than the power source that supplies power to the TCM 194) and therefore may not be affected by power faults present within the TCM 194. The engine speed module 246 outputs a signal 262 that indicates the engine speed.

The second solenoid control module 248 may control the solenoids 196-1 through 196-N and 198 when the fault diagnostic module 210 diagnoses a fault in the transmission system. However, the second solenoid control module 248 may or may not control the solenoids 196-1 through 196-N and 198 in response to a transmission system fault being diagnosed. For example, the second solenoid control module 248 may confirm that certain conditions are satisfied when a transmission system fault is diagnosed before controlling the solenoids 196-1 through 196-N and 198.

The second solenoid control module 248 may output control signals 264, 266, 268, and 270 to control the solenoid valves 196-1, 196-2, 196-N, and 198, respectively. The first solenoid control module 204 may output the control signals 264, 266, 268, and 270 to the third driver module 250, which may include one or more low-side current controlled (LCC) drivers. The third driver module 250 may control the amount of current supplied to the solenoid valves 196-1, 196-2, 196-N, and 198 based on the control signals 264, 266, 268, and 270, respectively. For example, the control signals 264, 266, 268, and 270 may each indicate a target amount of current, and third driver module 250 may adjust the amount of current supplied to the solenoid valves 196-1, 196-2, and 196-N to their respective target current amounts.

The second solenoid control module 248 and/or the third driver module 250 may control the amount of current supplied to the solenoid valves 196-1, 196-2, 196-N, and 198 in an open-loop manner. For example, the second solenoid control module 248 may estimate the amount of current supplied to the solenoid valves 196-1, 196-2, 196-N, and 198, and adjust the amount of voltage delivered to the solenoid valves 196-1, 196-2, 196-N, and 198 to minimize a difference between the estimated amount of current supplied and a target amount of current. The second solenoid control module 248 may estimate the amount of current supplied to the solenoid valves 196-1, 196-2, 196-N, and 198 based on a voltage output to the solenoid valves 196-1, 196-2, 196-N, and 198 and a resistance of the solenoid valves 196-1, 196-2, 196-N, and 198. The second solenoid control module 248 may estimate the resistance of the solenoid valves 196-1, 196-2, 196-N, and 198 based on the temperatures of the solenoid valves 196-1, 196-2, 196-N, and 198, respectively. The second solenoid control module 248 may use the intake air temperature from the IAT sensor 186 and/or a measured transmission oil temperature as an approximation of the temperatures of the solenoid valves 196-1, 196-2, 196-N, and 198.

Controlling the amount of current supplied to the solenoid valves 196-1, 196-2, 196-N, and 198 in an open-loop manner may improve simplicity relative to controlling the amount of current supplied to the solenoid valves 196-1, 196-2, 196-N, and 198 in a closed-loop manner. In addition, controlling the amount of current supplied to the solenoid valves 196-1, 196-2, 196-N, and 198 in an open-loop manner avoids relying on sensors that measure the current supplied to the solenoid valves 196-1, 196-2, 196-N, and 198. This ensures that the second solenoid control module 248 may control the solenoid valves 196-1, 196-2, 196-N, and 198 when the power supplied to the current sensors is interrupted. For example, if the current sensors are included in the first and second driver modules 206 and 208 the power 216 supplied to the first and second driver modules 206 and 208 is interrupted, the second solenoid control module 248 may control the solenoid valves 196-1, 196-2, 196-N, and 198.

Although described above as performing open-loop control, the second solenoid control module 248 and/or the third driver module 250 may control the amount of current supplied to the solenoid valves 196-1, 196-2, 196-N, and 198 in a closed-loop manner. In addition, the third driver module 250 may or may not control the dither current supplied to the solenoid valves 196-1, 196-2, 196-N, and 198. Thus, in summary, the third driver module 250 may provide the same level of functionality as the first and second driver modules 206 and 208 or a reduced level of functionality relative to the first and second driver modules 206 and 208 for improved simplicity. In another example of this, the third driver module 250 may include a single high side driver that supplies current to all of the solenoid valves 196-1, 196-2, 196-N, and 198. In contrast, the first and second driver modules 206 and 208 may include multiple high side drivers that independently supply current to the solenoid valves 196-1, 196-2, 196-N, and 198.

The second solenoid control module 248 outputs the control signals 264, 266, and 268 to control the solenoid valves 196-1, 196-2, and 196-N, respectively, and thereby shift gears in the transmission 166. The second solenoid control module 248 may shift gears in the transmission 166 based on the vehicle speed. In addition, the second solenoid control module 248 may output a control signal 272 to control the third driver module 250. For example, the second solenoid control module 248 may output the control signal 272 to enable or disable the third driver module 250.

The first and second solenoid control modules 204 and 248 may be different integrated circuits that do not share any common components such as memory. The integrated circuits may be mounted to the same printed circuit board (PCB) or different PCBs. In one example, the modules 202, 204, 206, and 208 may be mounted to one PCB, and the modules 235, 244, 246, 248, and 250 may be mounted to a different PCB. In addition, the first power pin 212 may supply power to all of the components mounted to the same PCB, or the same portion thereof, as the first solenoid control module 204, and the second power pin 252 may supply power to all of the components mounted to the same PCB, or the same portion thereof, as the second solenoid control module 248.

The third driver module 250 receives the unconverted power 256 from the second power pin 252 and regulates the amount of current 274 that flows from the first power pin 252 to the solenoid valves 196-1, 196-2, 196-N, and 198. The third driver module 250 may regulate the amount of current 274 that flows from the first power pin 252 to the solenoid valves 196-1, 196-2, 196-N, and 198 based on a target amount of current indicated by the control signals 264, 266, 268, and 270, respectively. The third driver module 250 may prevent current flow to the solenoid valves 196-1, 196-2, 196-N, and 198 when the first driver module 206 is disabled. The third driver module 250 may allow current to flow to the solenoid valves 196-1, 196-2, 196-N, and 198 when the first driver module 206 is enabled. The third driver module 250 may include one or more high-side drivers and/or one or more low-side drivers. The third driver module 250 may be connected to each of the solenoid valves 196-1, 196-2, 196-N, and 198 through a diode in order to electrically isolate the third driver module 250 from the solenoid valves 196-1, 196-2, 196-N, 198 when the third driver module 250 is disabled. In addition, when the third driver module 250 is disabled, the third driver module 250 may be maintained in a high impedance electrical state and may not impact current flow within the solenoid valves 196-1, 196-2, 196-N, 198 or any electrical or rationality-based diagnostics performed by the first driver module 206 or the fault diagnostic module 210.

When enabled, the third driver module 250 may regulate current flow to all of the same solenoid valves to which the first and second driver modules 206 and 208 regulate current flow. Thus, in various implementations, the third driver module 250 may control current flow to solenoids such as the line pressure solenoid, the torque converter clutch solenoid, the transmission auxiliary solenoid, and the park inhibit solenoid, as well as the solenoids that control the clutches in the transmission 166. The second solenoid control module 248 may enable the third driver module 250 when the second solenoid control module 248 controls the solenoid valves 196-1, 196-2, 196-N, and 198.

The second solenoid control module 248 may enable the third driver module 250 and control the solenoid valves 196-1, 196-2, 196-N, and 198 when the fault diagnostic module 210 diagnoses a fault in the transmission system. However, the second solenoid control module 248 may first determine whether operating parameters of the engine 102 and/or the transmission control system satisfy certain criteria. These operating parameters may include the engine speed, the voltage output of the first driver module 206, and the voltage output of the second driver module 208 indicated by the signals 262, 238, and 242, respectively.

The second solenoid control module 248 may use the engine speed indicated by the signal 262 as an approximation of the vehicle speed since the signal 262 is generated independent of whether the power supplied by the first power pin 212 is interrupted. In contrast, as indicated above, the TS sensor 188 may be powered by the first power pin 212. Thus, the second solenoid control module 248 may not use the transmission speed from the TS sensor 188 as an approximation of the vehicle speed since the TS sensor 188 may not output the transmission speed when the power supplied by the first power pin 212 is interrupted.

In various implementations, the TS sensor 188 may be powered by the converted power 218 from the first power supply module 202 and electrically isolated from the second power supply module 244 during normal operation. Then, if a loss of power fault related to the first power supply module 202 is diagnosed, the TS sensor 188 may be powered by the converted power 258 from the second power supply module 244 and electrically isolated from the first power supply module 202. In these implementations, when the power supplied by the first power pin 212 is interrupted, the second solenoid control module 248 may use the transmission speed from the TS sensor 188 as an approximation of vehicle speed instead of or in addition to using the engine speed indicated by the signal 262 as an approximation of the vehicle speed.

In one example, when the engine speed is less than a first speed, indicating that the vehicle is not moving, the second solenoid control module 248 may not control the solenoid valves 196-1, 196-2, 196-N, and 198 or enable the third driver module 250 when a transmission system fault is diagnosed. In turn, the first solenoid control module 204 may be allowed to shift the transmission to a default gear such as park or neutral by disabling the first driver module 206. The first speed may be a predetermined speed (e.g., 3,000 revolutions per minute).

In another example, when the engine speed is greater than the first speed, indicating that the vehicle is moving, the second solenoid control module 248 may assess the output voltages of the first and second driver modules 206 and 208. If the output voltage of the first driver module 206 is greater than a first voltage, the second solenoid control module 248 may not control the solenoid valves 196-1, 196-2, 196-N, and 198 or enable the third driver module 250. Similarly, if the output voltage of the second driver module 208 is greater than a second voltage, the second solenoid control module 248 may not control the solenoid valves 196-1, 196-2, 196-N, and 198 or enable the third driver module 250. The first and second voltages may be predetermined voltages and may be the same voltage or different voltages. In one example, the first and second voltages may be equal to a predetermined percentage (e.g., 80 percent) of an electrical system voltage (e.g., a voltage ranging from 13.5 volts to 14 volts).

If the engine speed is greater than the first speed and the output voltages of the first and second driver modules 206 and 208 are less than the first and second voltages, respectively, the second solenoid control module 248 may control the solenoid valves 196-1, 196-2, 196-N, and 198 and enable the third driver module 250. As noted above, the second solenoid control module 248 controls the solenoid valves 196-1, 196-2, 196-N, and 198 by outputting the control signals 264, 266, 268, and 270. In one example, the second solenoid control module 248 may energize the solenoid valves 196-1, 196-2, 196-N, and 198 by adjusting the control signals 264, 266, 268, and 270, respectively, to indicate a target duty cycle (e.g., 40 percent) and a target frequency (e.g., 3 kilohertz). The target frequency may be a fixed value.

The second solenoid control module 248 may control the solenoid valves 196-1, 196-2, and 196-N to shift the transmission 166 to a gear other than the default gear when the engine speed is greater than the first speed and the output voltages of the first and second driver modules 206 and 208 are less than the first and second voltages, respectively. The second solenoid control module 248 may select one of the other gears based on the vehicle speed and determine which one(s) of the solenoid valves 196-1, 196-2, and 196-N to energize based on the gear selected. For example, the second solenoid control module 248 may select second gear when the vehicle speed is less than a second speed (e.g., 20 miles per hour (mph) or 32 kilometers per hour). In another example, the second solenoid control module 248 may select fifth gear when the vehicle speed is greater than the second speed. The second solenoid control module 248 may estimate the vehicle speed based on the last value of the transmission speed received from the TS sensor 188.

Figure 3:
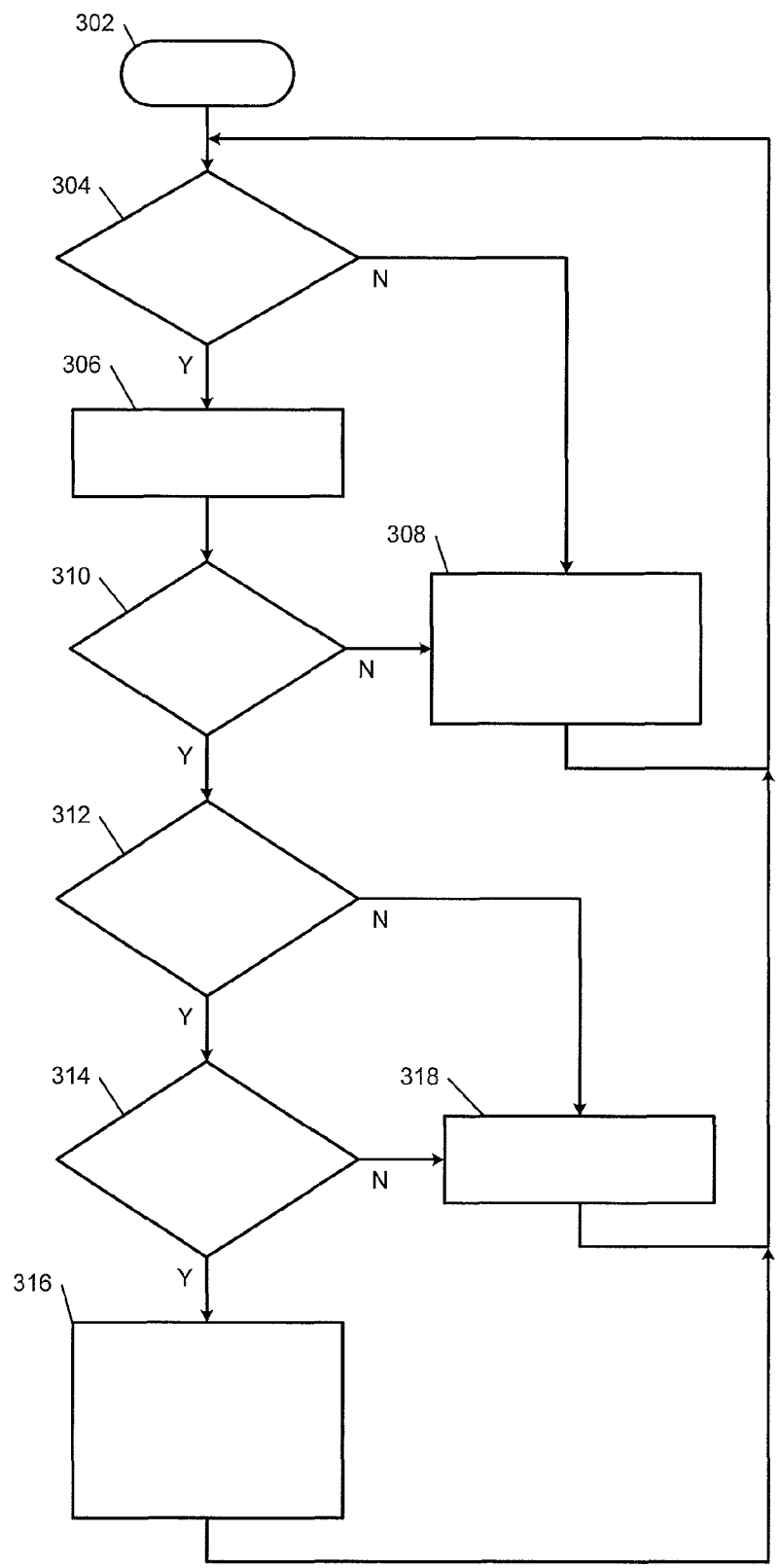
FIG. 3 is a flowchart illustrating an example control method according to the principles of the present disclosure.

Referring now to FIG. 3, an example method for controlling a transmission when a fault is diagnosed in a transmission control system begins at 302. The method of FIG. 3 is described in the context of the modules included in the example implementation of the TCM 194 shown in FIG. 2. However, the particular modules that perform the steps of the method of FIG. 3 may be different than the modules mentioned below and/or the method of FIG. 3 may be implemented apart from the modules of FIG. 3.

At 304, the first solenoid control module 204 determines whether a fault is diagnosed in the transmission control system. As indicated above, the transmission control system may include the TCM 194, the first power pin 212, and the first ground pin 214, and the fault diagnostic module 210 may diagnose a fault in the transmission control system. If a fault is diagnosed in the transmission control. system, the method continues at 306. Otherwise, the method continues at 308. At 306, the first solenoid control module 204 disables the first driver module 206 and/or the second driver module 208. Alternatively, the fault diagnostic module 210 may disable the first driver module 206 and/or the second driver module 208. At 308, the first solenoid control module 204 controls the solenoid valves 196-1, 196-2, and 196-N to shift gears in the transmission 166.

At 310, the second solenoid control module 248 determines whether the output voltage of the first driver module 206 is less than the first voltage. If the output voltage of the first driver module 206 is less than the first voltage, the method continues at 312. Otherwise, the method continues at 308.

At 312, the second solenoid control module 248 determines whether the output voltage of the second driver module 208 is less than the second voltage. If the output voltage of the second driver module 208 is less than the second voltage, the method continues at 314. Otherwise, the method continues at 316.

At 314, the second solenoid control module 248 determines whether the engine speed indicated by the signal 262 is greater than the first speed. If the engine speed is greater than the first speed, the method continues at 316. Otherwise, the method continues at 318. At 316, the second solenoid control module 248 enables the third driver module 250 and controls the solenoid valves 196-1, 196-2, and 196-N to shift gears in the transmission 166.

At 318, the first solenoid control module 204 shifts the transmission 166 to a default gear such as park or neutral. For example, the second solenoid control module 248 may not control the solenoid valves 196-1, 196-2, 196-N, and 198 or enable the third driver module 250. Therefore, the first solenoid control module 204 may be allowed to shift the transmission 166 to the default gear by disabling the first driver module 206.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C.§112(f) unless an element is expressly recited using the phrase "means for," or in the case of a method claim using the phrases "operation for" or "step for."

What is claimed is:

1. A system comprising:
a first solenoid control module that outputs a first electronic control signal to control a plurality of solenoids to shift gears in a transmission;
a fault diagnostic module that diagnoses a fault in a transmission control system based on an operating parameter of the transmission control system; and
a second solenoid control module that outputs a second electronic control signal to selectively control the plurality of solenoids to shift gears in the transmission when a fault in the transmission control system is diagnosed.

2. A system comprising:
a first solenoid control module that controls a plurality of solenoids to shift gears in a transmission;
a fault diagnostic module that diagnoses a fault in a transmission control system based on an operating parameter of the transmission control system; and
a second solenoid control module that selectively controls the plurality of solenoids to shift gears in the transmission when a fault in the transmission control system is diagnosed, wherein the first and second solenoid control modules are different integrated circuits.

3. A system comprising:
a first solenoid control module that controls a plurality of solenoids to shift gears in a transmission;
a fault diagnostic module that diagnoses a fault in a transmission control system based on an operating parameter of the transmission control system; and
a second solenoid control module that selectively controls the plurality of solenoids to shift gears in the transmission when a fault in the transmission control system is diagnosed, wherein:
the first solenoid control module is powered by a first power pin and the second solenoid control module is powered by a second power pin that is different than the first power pin; and
the first solenoid control module is grounded by a first ground pin and the second solenoid control module is grounded by a second ground pin that is different than the first ground pin.

4. The system of claim 1 wherein the second solenoid control module controls the plurality of solenoids based on at least one of engine speed and a voltage output of a driver that supplies power to the plurality of solenoids.

5. The system of claim 4 further comprising an engine speed module that determines the engine speed based on an input from a sensor that is powered independent of a power supply that supplies power to the first solenoid control module.

6. The system of claim 4 wherein the second solenoid control module controls the plurality of solenoids to shift the transmission to a default gear when the engine speed is less than a first speed and the voltage output of the driver is less than a first voltage.

7. The system of claim 6 wherein the default gear includes at least one of park and neutral.

8. The system of claim 6 wherein the second solenoid control module controls the plurality of solenoids to shift the transmission to a forward gear when the engine speed is greater than the first speed and the voltage output of the driver is less than the first voltage.

9. The system of claim 8 wherein the second solenoid control module selects the forward gear based on vehicle speed.

10. The system of claim 1 wherein the second solenoid control module:
estimates an amount of current supplied to the plurality of solenoids based on a temperature of the plurality of solenoids; and
controls the amount of current supplied to the plurality of solenoids based on the estimated amount of current supplied to the plurality of solenoids.

11. A method comprising:
outputting a first electronic control signal to control a plurality of solenoids to shift gears in a transmission using a first solenoid control module;
diagnosing a fault in a transmission control system based on an operating parameter of the transmission control system; and
outputting a second electronic control signal to selectively control the plurality of solenoids to shift gears in the transmission using a second solenoid control module when a fault in the transmission control system is diagnosed.

12. The method of claim 11 wherein the first and second solenoid control modules are different integrated circuits.

13. The method of claim 11 wherein:
the first solenoid control module is powered by a first power pin and the second solenoid control module is powered by a second power pin that is different than the first power pin; and
the first solenoid control module is grounded by a first ground pin and the second solenoid control module is grounded by a second ground pin that is different than the first ground pin.

14. The method of claim 11 further comprising controlling the plurality of solenoids based on at least one of engine speed and a voltage output of a driver that supplies power to the plurality of solenoids when a fault in the transmission control system is diagnosed.

15. The method of claim 14 further comprising determining the engine speed based on an input from a sensor that is powered independent of a power supply that supplies power to the first solenoid control module.

16. The method of claim 14 further comprising controlling the plurality of solenoids to shift the transmission to a default gear when a fault in the transmission control system is diagnosed, the engine speed is less than a first speed, and the voltage output of the driver is less than a first voltage.

17. The method of claim 16 wherein the default gear includes at least one of park and neutral.

18. The method of claim 16 further comprising controlling the plurality of solenoids to shift the transmission to a forward gear when a fault in the transmission control system is diagnosed, the engine speed is greater than the first speed, and the voltage output of the driver is less than the first voltage.

19. The method of claim 18 further comprising selecting the forward gear based on vehicle speed.

20. The method of claim 11 further comprising:
estimating an amount of current supplied to the plurality of solenoids based on a temperature of the plurality of solenoids; and
controlling the amount of current supplied to the plurality of solenoids based on the estimated amount of current supplied to the plurality of solenoids when a fault in the transmission control system is diagnosed.

* * * * *